J. E. GERRY.
ICE CREEPER.
APPLICATION FILED MAR. 27, 1911.

995,784.

Patented June 20, 1911.

Witnesses
W. A. Williams
Dudley Browne

Inventor
James E. Gerry

By Browne & Phelps
Attorneys

UNITED STATES PATENT OFFICE.

JAMES EDWARD GERRY, OF SOUTH BELLINGHAM, WASHINGTON.

ICE-CREEPER.

995,784.

Specification of Letters Patent. Patented June 20, 1911.

Application filed March 27, 1911. Serial No. 617,218.

*To all whom it may concern:*

Be it known that I, JAMES EDWARD GERRY, a citizen of the United States, residing at South Bellingham, in the county of Whatcom and State of Washington, have invented certain new and useful Improvements in Ice-Creepers, of which the following is a specification.

My invention relates to certain new and useful improvements in ice creepers, and the object of my invention is to provide an ice creeper which may be securely attached to the boot or shoe of the wearer, and one in which the ice dog may be turned up when not in use and held in such upturned position, the dog when in use being also locked in its lowered or operative position.

A further object of my invention is to provide an ice creeper which shall be simple in construction, efficient in operation and composed of few parts.

With these and other objects in view my invention consists in certain constructions, combinations and arrangement of parts, the preferred form of which will be first described in connection with the accompanying drawings and then the invention particularly pointed out in the appended claims.

Figure 1:
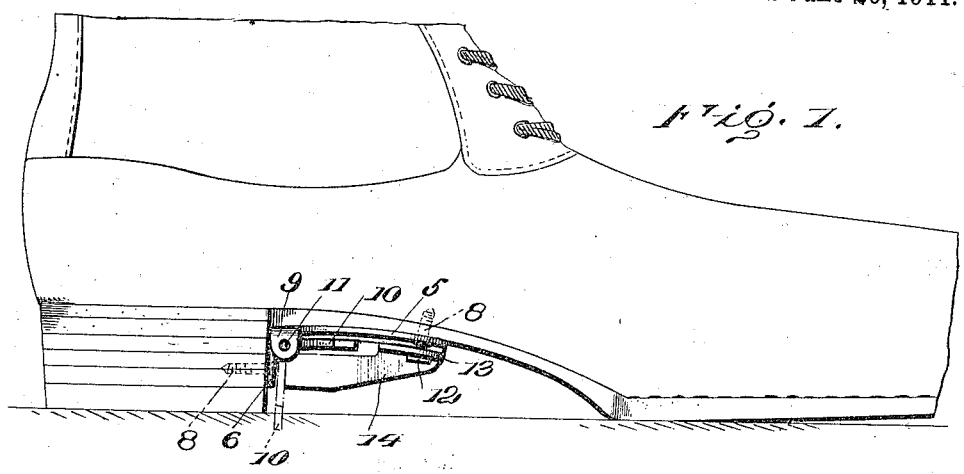
Figure 2:
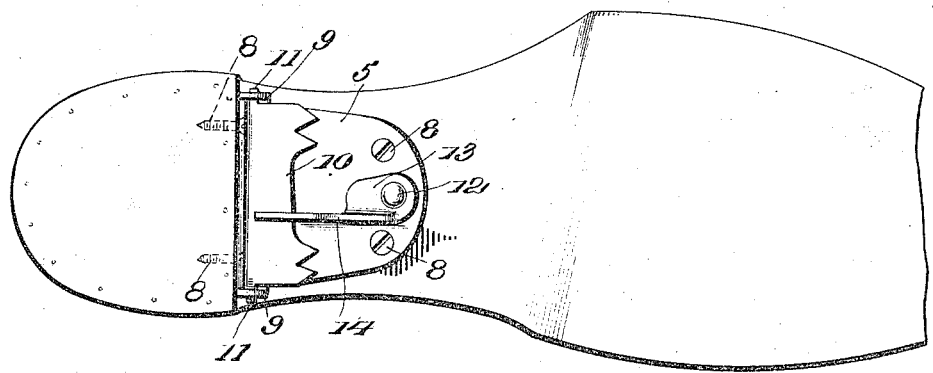
Figure 3:
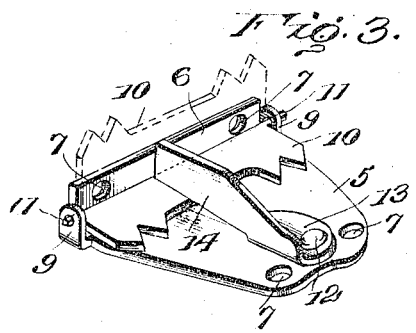
Figure 4:
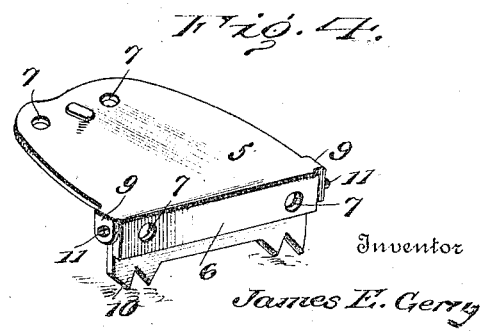

Referring to the drawings wherein the same part is designated by the same reference numeral wherever it occurs, Figure 1 is a side view of a shoe with my preferred form of creeper secured thereto, the dog being shown in full lines in its position when not in use, and in dotted lines in its down, or operative position. Fig. 2 is a bottom plan view of the shoe shown in Fig. 1. Fig. 3 is a perspective view of the creeper with the dog shown in dotted lines in its operative position, and Fig. 4 is a perspective view of the creeper with the dog shown in operative position.

5 designates a plate having its rear end downturned to form the portion 6, the portions 5 and 6 being provided with openings 7, adapted to receive screws 8 by means of which the plate 5 is secured to the shank of the shoe, the downturned portion 6 being also secured to the front of the heel by means of screws 8, as clearly shown in Figs. 1 and 2. Preferably and as shown the plate 5 is curved so as to closely fit the shank. A pair of ears 9 extend from opposite sides of the plate adjacent to the portion 6, and 10 is the ice dog pivoted in the ears by means of the pivots 11 extending from opposite ends of the dog. Pivoted on to the plate 5, as by means of the pivot 12, is an ear 13 extending laterally from a locking bar 14, the end of which is adapted to engage the side of the ice dog when the ice dog is in operative position, as shown in dotted lines in Fig. 3. When the dog is thrown down to its inoperative position the catch is adapted to swing over the same and hold it in such inoperative position as shown by the full lines in Fig. 3.

From the foregoing it will be seen that when once the creeper is fastened in position on the shank and front of the heel of the shoe it is only necessary to swing the locking member off to one side in order to move the dog from its operative to inoperative position, and that when the locking member is returned to the position shown in Figs. 2 and 3 the dog will be held in whichever of its positions it has been thrown.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In an ice creeper, the combination with a plate adapted to be secured to the shank of a shoe, of an ice dog pivotally mounted on the plate, and a locking bar pivoted on the plate and adapted to hold the dog in either its operative or inoperative position.

2. In an ice creeper, the combination with a plate adapted to be secured to the shank of a shoe, said plate having a downwardly extending portion adapted to be secured to the front of a heel, of an ice dog pivotally mounted on the plate adjacent said downturned portion, and a locking bar pivoted on the plate and adapted to hold the dog in either its operative or inoperative position.

In testimony whereof I affix my signature in presence of two witnesses.

JAMES EDWARD GERRY.

Witnesses:
WILLIAM BROWN,
T. F. BEVANS.